United States Patent Office 3,527,428
Patented Sept. 8, 1970

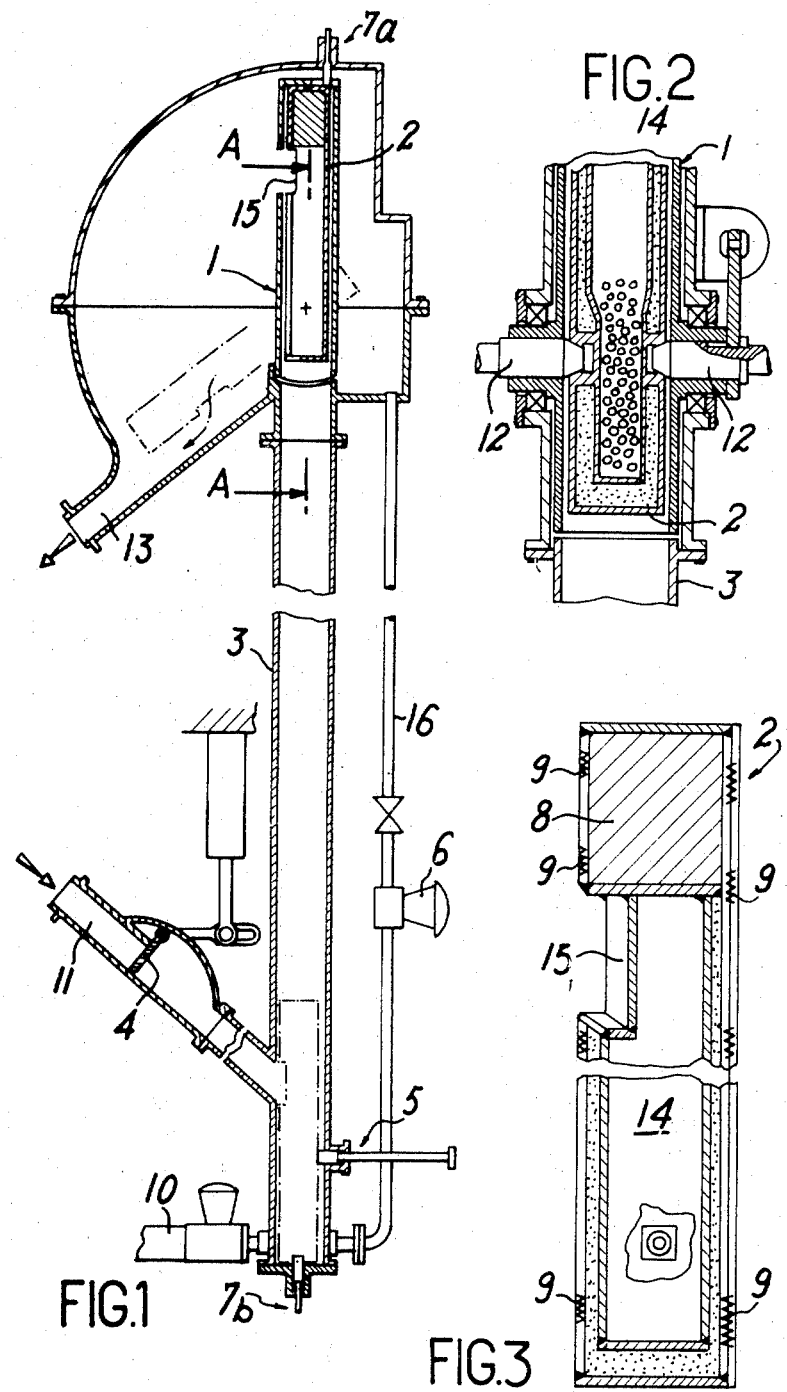

3,527,428
DEVICE FOR TRANSFERRING GRANULAR
MATERIALS
Zygmunt Skibicki, Varsovie, Poland, assignor to Commissariat a l'Energie Atomique, Paris, France, and Instytut Badan Jadrowych, Varsovie, Poland
Filed Oct. 7, 1968, Ser. No. 765,356
Claims priority, application Poland, Oct. 14, 1967, P 123,014
Int. Cl. B65g 51/04
U.S. Cl. 243—1    5 Claims

ABSTRACT OF THE DISCLOSURE

A device for transferring granular materials comprising a reservoir-plunger which is adapted to slide within a vertical guide tube and which is provided with an internal chamber for receiving said material, pneumatic means for causing the displacement of said plunger between a bottom position in which an opening of said chamber is located opposite to a pipe for the supply of granular material and a top position in which said reservoir-plunger is wholly contained in an extension of said guide tube which is pivoted about a fixed axis and means for locking said reservoir-plunger within said extension, said means being actuated prior to initiating the pivotal movement of said extension.

---

The present invention is directed to a device for transferring granular materials as applicable in particular to the process whereby refractory balls such as those employed as a heat-transporting medium in some types of heat exchanger are transferred at high temperatures and variable pressures.

In exchangers of this type, the transfer of refractory balls is carried out between two enclosures at different temperatures: in the first enclosure, the balls are, for example, heated to a high temperature by a hot fluid which is usually a gas whereas, in the second enclosure, said balls yield their heat to a cooler fluid. It is clear that cooling of the balls during transfer must be minimized and that any damaging of the balls must be prevented.

The present invention is directed to the design concept of a transfer device which meets practical requirements more effectively than has been permitted heretofore by comparable devices of the prior art. The chief aim of the invention is to avoid the use of complicated lock-chambers which, in the case of the application mentioned in the foregoing, could reduce leakage of hot gases but would also give rise to substantial heat losses. A further aim of the invention is to solve the problems which are presented, especially in regard to lubrication and leak-tightness, by the high temperatures to which the refractory balls are subjected (700–800° C.) and to secure freedom from any risk of damage to the balls (breakage or chipping) as is at present involved in devices of known types for the individual transfer of large ceramic grains.

The invention has for its object a device for transferring granular materials as applicable in particular to the transfer of refractory balls within a heat exchanger, characterized in that it comprises a reservoir-plunger which is adapted to slide within a vertical guide tube and which is provided with an internal chamber for receiving said material, pneumatic means for causing the displacements of said plunger between a bottom position in which an opening of said chamber is located opposite to a pipe for the supply of granular material and a top position in which said reservoir-plunger is wholly contained in an extension of said guide tube which is pivoted about a fixed axis and means for locking said reservoir-plunger within said extension, said means being actuated prior to initiating the pivotal movement of said extension.

A better understanding of the invention will be gained from the following description of one exemplified embodiment which is given without any implied limitation and illustrated in the accompanying drawings, wherein:

FIG. 1 is a longitudinal sectional view of a transfer device in accordance with the invention;

FIGS. 2 and 3 are longitudinal sectional views taken along perpendicular planes and showing details of the apparatus.

In accordance with the embodiment of FIG. 1, the device for transferring granular materials is employed for the purpose of conveying refractory balls from a first enclosure in which they are heated to a high temperature by a hot fluid to a second enclosure in which they yield their heat to a cooler fluid. The granular material is introduced into the device through a feed pipe 11, elevated within a guide tube 3 and discharged through an outlet pipe 13.

A reservoir-plunger 2 as shown in greater detail in FIG. 3 is slidably mounted within the vertical guide tube 3. There is formed within the reservoir-plunger 2 an internal chamber 14 which is intended to contain the refractory material during the transfer process. Said chamber is heat-insulated with respect to the outer walls of the reservoir-plunger. An opening 15 formed in the walls of the chamber provides a passageway for the refractory material. Labyrinths 9 are arranged on each side of said opening around the entire periphery of the reservoir-plunger for the purpose of limiting the circulation of gas between the reservoir-plunger and the guide tube, thus ensuring leak-tightness during the displacements of the reservoir-plunger.

Provision is made in the upper portion of the reservoir-plunger 2 for an aluminum packing 8, the intended function of which is to store and to transfer heat. The guide tube 3 is fitted with a guide (not shown in the drawings) which prevents the reservoir-plunger from rotating about its vertical axis.

A valve 10 at the lower end of the guide tube 3 serves to admit compressed air and to cause the upward displacement of the reservoir-plunger within the guide tube. Conversely, a pipe 16 which provides a connection between the two ends of the guide tube serves to balance the pressures therein for the purpose of returning the reservoir-plunger in the downward direction.

When the reservoir-plunger is in its bottom position as shown in chain-dotted lines in FIG. 1, the opening 15 is located opposite to the feed pipe 11. In the top position thereof, said plunger is entirely contained within an extension 1 of the guide tube 3 which is pivoted about a fixed axis. The reservoir-plunger can be maintained inside said extension 1 by locking means which are actuated prior to initiating the pivotal movement of said extension.

As shown in FIG. 2, the means aforesaid are constituted by two locking-plungers 12 which are capable of moving within the wall of the extension along the axis of rotation; the ends of said locking-plungers are adapted to penetrate into recesses of the reservoir-plunger in order to lock this latter in position. Said locking-plungers nevertheless permit the pivotal movement of the extension 1 together with the reservoir-plunger by reason of their location in the axis of rotation.

The operation of the device is regulated in a conventional manner by means of valves, electric contacts and time-delay relays, this being carried out automatically with a possibility of manual readjustment.

In the bottom position of the reservoir-plunger 2, a time-delay relay initiates the opening of the valve 4 in the feed pipe 11 and said plunger 2 is filled with a suitable quantity of hot granular material by means of a suitable metering device. On completion of the filling operation, the valve 10 opens (the valve 4 being closed) and the plunger 2 which is displaced as a result of the admission of air accordingly moves upwards into the interior of the pivotal extension 1; said plunger 2 is braked at the end of travel by means of an air damper. In this position, the top contact 7a releases the locking-plungers 12 which accordingly produce a lateral locking action on the plunger 2. The air-admission opening closes (valve 10); at that moment, a jack causes the extension 1 of the tube 3 to perform a pivotal movement together with the reservoir-plunger down to an inclined position which permits the discharge of the granular material into the pipe 13. After the complete assembly has returned to the vertical position, the top contact opens the valve 6 which provides a connection with the end of the tube 3 and the reservoir-plunger 2 begins to move downwards until the moment of braking by the bottom air-damper 7b.

The output of the elevator (mass of granular material transferred per unit of time) is regulated, at least to large extent, by producing a variation in the frequency of repetition of the foregoing operations by means of a time-delay relay.

In order to prevent small grains from falling at any time between the reservoir-plunger 2 and the tube 3 during the filling operation as this would be liable to result in seizure, provision has been made in addition for a clamping mechanism 5 which applies the plunger 2 against that portion of the wall of the tube 3 into which opens the pipe for the admission of granular material.

What I claim is:

1. A device for transferring granular materials comprising a reservoir-plunger which is adapted to slide within a vertical guide tube and which is provided with an internal chamber for receiving said material, pneumatic means for causing the displacement of said plunger between a bottom position in which an opening of said chamber is located opposite to a pipe for the supply of granular material and a top position in which said reservoir-plunger is wholly contained in an extension of said guide tube which is provided with means to pivot it about a fixed axis between a first position in alignment with said tube and a second position at an angle to said tube and means for locking said reservoir-plunger within said extension to discharge said material when the extension is pivoted to said second position, said locking means being actuated prior to initiating the pivotal movement of said extension.

2. A transfer device in accordance with claim 1, wherein said locking means are constituted by plungers which are capable of moving within the wall of said pivotal extension along the axis of rotation thereof until said locking-plungers penetrate partially into lateral recesses provided for that purpose in the reservoir-plunger.

3. A transfer device in accordance with claim 1, comprising a pipe providing a communication between the two ends of said guide tube, thereby balancing the pressures at said ends and allowing the return of the reservoir-plunger to the bottom position thereof.

4. A transfer device in accordance with claim 1, wherein labyrinths are arranged in the walls of the reservoir-plunger in order to ensure gas-tightness with the guide tube.

5. A transfer device in accordance with claim 1, comprising a mechanism for applying the reservoir-plunger against the wall of the guide tube in the vicinity of the pipe for the admission of granular material.

References Cited

UNITED STATES PATENTS

| | | | |
|---|---|---|---|
| 2,912,066 | 11/1959 | Ellithorpe | 743—1 |
| 3,438,337 | 4/1969 | Edwards | 743—1 |

FOREIGN PATENTS

| | | |
|---|---|---|
| 6,709,021 | 6/1967 | Netherlands. |

HARVEY C. HORNSBY, Primary Examiner

U.S. Cl. X.R.

243—2, 20, 25, 38; 302—2